US011460071B2

(12) United States Patent
Hayashi et al.

(10) Patent No.: US 11,460,071 B2
(45) Date of Patent: Oct. 4, 2022

(54) TAPERED ROLLER BEARING

(71) Applicant: NTN Corporation, Osaka (JP)

(72) Inventors: Yasuyoshi Hayashi, Kuwana (JP); Takashi Wakisaka, Kuwana (JP); Sahoko Manda, Kuwana (JP)

(73) Assignee: NTN Corporation, Osaka (JP)

(*) Notice: Subject to any disclaimer, the term of this patent is extended or adjusted under 35 U.S.C. 154(b) by 0 days.

(21) Appl. No.: 17/295,534

(22) PCT Filed: Dec. 4, 2019

(86) PCT No.: PCT/JP2019/047323
§ 371 (c)(1),
(2) Date: May 20, 2021

(87) PCT Pub. No.: WO2020/116488
PCT Pub. Date: Jun. 11, 2020

(65) Prior Publication Data
US 2022/0018391 A1    Jan. 20, 2022

(30) Foreign Application Priority Data

Dec. 7, 2018  (JP) ............................. JP2018-229909
Oct. 30, 2019  (JP) ............................. JP2019-197666

(51) Int. Cl.
*F16C 19/34* (2006.01)
*F16C 33/58* (2006.01)
*F16C 19/36* (2006.01)

(52) U.S. Cl.
CPC .......... *F16C 19/364* (2013.01); *F16C 33/583* (2013.01)

(58) Field of Classification Search
CPC .... F16C 19/364; F16C 33/583; F16C 33/585; F16C 33/4605; F16C 33/4623; F16C 33/4635; F16C 33/4676; F16C 33/4682
See application file for complete search history.

(56) References Cited

U.S. PATENT DOCUMENTS 2,024,206 A * 12/1935 Hillbouse ............... F16C 25/08
384/571
2008/0044121 A1* 2/2008 Hofmann ............ F16C 19/364
384/571
(Continued)

FOREIGN PATENT DOCUMENTS

FR        2998630 A1 *  5/2014 ............ F16C 19/364
JP       S47-033433 U   12/1972
(Continued)

OTHER PUBLICATIONS

International Preliminary Report on Patentability of PCT/JP2019/047323 dated Jun. 17, 2021 and English translation thereof.
(Continued)

*Primary Examiner* — Phillip A Johnson
(74) *Attorney, Agent, or Firm* — Muncy, Geissler, Olds & Lowe, P.C.

(57) ABSTRACT

An object of the present invention to provide a tapered roller bearing in which a flange portion is formed at a large-diameter end of an outer ring track surface of an outer ring, capable of providing high moment stiffness and long life without extremely decreasing its pure axial load capacity. The tapered roller bearing comprising: an outer ring 12 having an outer ring track surface 12a on its inner circumferential surface; an inner ring 13 having an inner ring track surface 13a on its outer circumferential surface; a plurality of tapered rollers 14 rotatably disposed between the outer ring track surface 12a and the inner ring track surface 13a; and a retainer 15 having a plurality of pockets for retaining the plurality of tapered rollers 14 at a predetermined interval; the outer ring track surface 12a of the outer ring 12 having a small-diameter end and a large-diameter end, the inner ring track surface 13a of the inner ring 13 having a small-diameter end and a large-diameter end, and, of these four ends, a flange portion 12b that protrudes radially
(Continued)

inwardly is formed at the large-diameter end of the outer ring track surface 12*a* of the outer ring 12; wherein the tapered roller bearing has a contact angle greater than 35° and a roller angle not greater than 3.5°.

3 Claims, 22 Drawing Sheets

(56) References Cited

U.S. PATENT DOCUMENTS

| | | |
|---|---|---|
| 2009/0304319 A1 | 12/2009 | Ohtsuki et al. |
| 2010/0178004 A1 | 7/2010 | Tsujimoto et al. |
| 2015/0323008 A1 | 11/2015 | Koganei et al. |
| 2017/0204906 A1 | 7/2017 | Koganei et al. |
| 2018/0119735 A1 | 5/2018 | Hayashi et al. |
| 2018/0306237 A1* | 10/2018 | Hofmann .............. F16C 33/585 |
| 2021/0025445 A1 | 1/2021 | Wakisaka |

FOREIGN PATENT DOCUMENTS

| | | |
|---|---|---|
| JP | H1-85521 U | 6/1989 |
| JP | 2007-187308 A | 7/2007 |
| JP | 2008-309270 A | 12/2008 |
| JP | 2010-286120 A | 12/2010 |
| JP | 5340561 B2 | 11/2013 |
| JP | 2014-211230 A | 11/2014 |
| JP | 2015124796 A * | 7/2015 |
| JP | 2016-196944 A | 11/2016 |
| JP | 2016-200227 A | 12/2016 |
| JP | 2017-187148 A | 10/2017 |
| JP | 2018-109448 A | 7/2018 |
| JP | 2019-173841 A | 10/2019 |
| WO | 2020/116488 A1 | 6/2020 |

OTHER PUBLICATIONS

The extended European search report of the corresponding EP application No. 19894245 dated Jul. 13, 2022.

* cited by examiner

TAPERED ROLLER BEARING

TECHNICAL FIELD

The present invention relates to tapered roller bearings for use in speed reducers of robots and construction machines, and in particular relates to a tapered roller bearing having a small-diameter end and a large-diameter end of an outer ring track surface of an outer ring, and a small-diameter end and a large-diameter end of an inner ring track surface of an inner ring in which, of these four ends, a flange portion that radially inwardly protrudes is formed only at the large-diameter end of the outer ring track surface of the outer ring.

BACKGROUND ART

Patent Literature 1 and Patent Literature 2 individually disclose a tapered roller bearing in which a flange portion is not formed at the large-diameter end of the inner ring track surface of the inner ring, and the flange portion that radially inwardly protrudes is formed only at the large-diameter end of the outer ring track surface of the outer ring. However, this type of tapered roller bearing has rarely been made into products.

CITATION LIST

Patent Literature

Patent Literature 1: JP-U H01-85521 Gazette
Patent Literature 2: JP-A 2016-196944 Gazette

SUMMARY OF INVENTION

Technical Problem

The reason is that the tapered roller bearing in which the flange portion is formed at the large-diameter end of the outer ring track surface of the outer ring has an extremely decreased pure axial load capacity when compared with a tapered roller bearing in which the flange portion is formed at the large-diameter end of the inner ring track surface of the inner ring.

Therefore, it is an object of the present invention to provide a tapered roller bearing in which a flange portion is formed at the large-diameter end of the outer ring track surface of the outer ring, capable of providing high moment stiffness and long life without extremely decreasing its pure axial load capacity.

Solution to Problem

In order to solve the above-described problem, the present invention provides a tapered roller bearing including: an outer ring having an outer ring track surface on its inner circumferential surface; an inner ring having an inner ring track surface on its outer circumferential surface; a plurality of tapered rollers rotatably disposed between the outer ring track surface and the inner ring track surface; and a retainer having a plurality of pockets for retaining the plurality of tapered rollers at a predetermined interval. The outer ring track surface of the outer ring has a small-diameter end and a large-diameter end, the inner ring track surface of the inner ring has a small-diameter end and a large-diameter end, and, of these four ends, a flange portion which radially inwardly protrudes is formed at the large-diameter end of the outer ring track surface of the outer ring. In this arrangement, the tapered roller bearing has a contact angle (angle made by a center axis of the bearing and the outer ring track surface) of 40 through 50° and a roller angle not greater than 3.5°. With the arrangement disclosed above, the bearing becomes capable of providing high moment stiffness and long life without extremely decreasing its pure axial load capacity.

Advantageous Effects of Invention

In tapered roller bearings, in a case where two bearings have a same roller size, quantity, contact angle, roller angle, and angle x made by a location at point of tangency of the roller relative to the flange portion and the flange-side track surface, when comparing the bearing as shown in FIG. 2 in which the flange portion is formed at the large-diameter end of the inner ring track surface of the inner ring (hereinafter called "inner-ring-flange bearing") with the bearing as shown in FIG. 1 in which the flange portion is formed at the large-diameter end of the outer ring track surface of the outer ring (hereinafter called "outer-ring-flange bearing"), the outer-ring-flange bearing receives greater rolling element loads (outer ring side rolling element load Fio, inner ring side rolling element load Fii) and a contact surface pressure between the rolling element and the track ring than the inner-ring-flange bearing when a pure axial load (Fa) is applied. However, if the contact angle is set to 40 through 50°, and the roller angle is set to a value not greater than 3.5° according to the present invention, it is possible to reduce the increase in the rolling element loads (outer ring side rolling element load Fio, inner ring side rolling element load Fii) and the contact surface pressure from the track ring when the pure axial load (Fa) is applied. It is also possible to reduce rolling element loads and a contact surface pressure from the track ring when a pure radial load (Fr) is applied.

Calculation formulas for the rolling element loads when the pure axial load is applied to the outer-ring-flange bearing as shown in FIG. 1 and the inner-ring-flange bearing as shown in FIG. 2 are as follows, Fio: Outer ring side rolling element load (Inner-ring-flange bearing), Foo: Outer ring side rolling element load (Outer-ring-flange bearing), Fii: Inner ring side rolling element load (Inner-ring-flange bearing), Foi: Inner ring side rolling element load (Outer-ring-flange bearing), Fir: Flange side rolling element load (Inner-ring-flange bearing), For: Flange side rolling element load (Outer-ring-flange bearing), α: Outer ring half angle,
θ: Inner ring half angle,
β: Roller angle,
x: Angle made by a location at point of tangency of the roller relative to the flange portion and the flange-side track surface.
Y: Angle at point of tangency between a roller large end surface and an inner ring flange portion (θ+x), and
δ: Angle at point of tangency between a roller large end surface and an outer ring flange portion (α−x).

With the above, here are the formulas:

$$Fio = Fa/\sin \alpha$$

$$Foo = Foi(\sin \theta \cdot \sin \delta + \cos \theta \cdot \cos \delta)/(\cos \alpha \cdot \cos \delta + \sin \alpha \cdot \sin \delta)$$

$Fii = Fio(\sin\alpha\cdot\sin Y + \cos\alpha\cdot\cos Y)/(\cos\theta\cdot\cos Y + \sin\theta\cdot\sin Y)$ $Foi = Fa/\sin\theta$ $Fir = (Fii\cos\theta - Fio\cos\alpha)/\sin Y$ $For = (Foi\cos\theta - Foo\cos\alpha)/\sin\delta$ Using the above-described calculating formulas, maximum rolling element load and maximum contact surface pressure when the pure axial load Fa is applied are obtained for each example in which the contact angle is set to 40 through 50°, and the roller angle is set to a value not greater than 3.5°, and for each example in which the contact angle is set to a value not greater than 40°, and the roller angle is set to a value not smaller than 3.5°. Results are shown in Table 1 through Table 6.

TABLE 1

| Comparison Item | | Unit | Example 1 | | Example 2 | |
|---|---|---|---|---|---|---|
| | | | Inner-Ring-Flange Bearing | Outer-Ring-Flange Bearing | Inner-Ring-Flange Bearing | Outer-Ring-Flange Bearing |
| Contact angle | | ° | 50 | | 50 | |
| Roller Angle | | ° | 3 | | 3.5 | |
| Maximum Rolling Element Load | Inner-Ring Side | % | 100 | 105 | 100 | 105 |
| | Outer-Ring Side | % | 100 | 105 | 100 | 106 |
| | Flange Side | % | 100 | 105 | 100 | 106 |
| Maximum Contact Surface Pressure | Inner-Ring Side | % | 100 | 102 | 100 | 103 |
| | Outer-Ring Side | % | 100 | 102 | 100 | 103 |

TABLE 2

| Comparison Item | | Unit | Example 3 | | Example 4 | |
|---|---|---|---|---|---|---|
| | | | Inner-Ring-Flange Bearing | Outer-Ring-Flange Bearing | Inner-Ring-Flange Bearing | Outer-Ring-Flange Bearing |
| Contact angle | | ° | 45 | | 45 | |
| Roller Angle | | ° | 3 | | 3.5 | |
| Maximum Rolling Element Load | Inner-Ring Side | % | 100 | 105 | 100 | 107 |
| | Outer-Ring Side | % | 100 | 104 | 100 | 107 |
| | Flange Side | % | 100 | 105 | 100 | 107 |
| Maximum Contact Surface Pressure | Inner-Ring Side | % | 100 | 102 | 100 | 103 |
| | Outer-Ring Side | % | 100 | 102 | 100 | 103 |

TABLE 3

| Comparison Item | | Unit | Example 5 | | Example 6 | |
|---|---|---|---|---|---|---|
| | | | Inner-Ring-Flange Bearing | Outer-Ring-Flange Bearing | Inner-Ring-Flange Bearing | Outer-Ring-Flange Bearing |
| Contact angle | | ° | 40 | | 40 | |
| Roller Angle | | ° | 3.5 | | 2 | |
| Maximum Rolling Element Load | Inner-Ring Side | % | 100 | 108 | 100 | 104 |
| | Outer-Ring Side | % | 100 | 108 | 100 | 104 |
| | Flange Side | % | 100 | 108 | 100 | 104 |
| Maximum Contact Surface Pressure | Inner-Ring Side | % | 100 | 104 | 100 | 102 |
| | Outer-Ring Side | % | 100 | 104 | 100 | 102 |

TABLE 4

| Comparison Item | | Unit | Example 7 | | Example 8 | |
|---|---|---|---|---|---|---|
| | | | Inner-Ring-Flange Bearing | Outer-Ring-Flange Bearing | Inner-Ring-Flange Bearing | Outer-Ring-Flange Bearing |
| Contact angle | | ° | 35 | | 40 | |
| Roller Angle | | ° | 3.5 | | 8 | |
| Maximum Rolling Element Load | Inner-Ring Side | % | 100 | 110 | 100 | 122 |
| | Outer-Ring Side | % | 100 | 110 | 100 | 120 |
| | Flange Side | % | 100 | 110 | 100 | 121 |
| Maximum Contact Surface Pressure | Inner-Ring Side | % | 100 | 105 | 100 | 110 |
| | Outer-Ring Side | % | 100 | 105 | 100 | 111 |

TABLE 5

| Comparison Item | | Unit | Example 9 | | Example 10 | |
|---|---|---|---|---|---|---|
| | | | Inner-Ring-Flange Bearing | Outer-Ring-Flange Bearing | Inner-Ring-Flange Bearing | Outer-Ring-Flange Bearing |
| Contact angle | | ° | 40 | | 10 | |
| Roller Angle | | ° | 5 | | 3.5 | |
| Maximum Rolling Element Load | Inner-Ring Side | % | 100 | 112 | 100 | 131 |
| | Outer-Ring Side | % | 100 | 112 | 100 | 131 |
| | Flange Side | % | 100 | 112 | 100 | 131 |
| Maximum Contact Surface Pressure | Inner-Ring Side | % | 100 | 106 | 100 | 114 |
| | Outer-Ring Side | % | 100 | 106 | 100 | 113 |

TABLE 6

| Comparison Item | | Unit | Example 11 | |
|---|---|---|---|---|
| | | | Inner-Ring-Flange Bearing | Outer-Ring-Flange Bearing |
| Contact angle | | ° | 30 | |
| Roller Angle | | ° | 8.5 | |
| Maximum Rolling Element Load | Inner-Ring Side | % | 100 | 137 |
| | Outer-Ring Side | % | 100 | 140 |
| | Flange Side | % | 100 | 139 |
| Maximum Contact Surface Pressure | Inner-Ring Side | % | 100 | 117 |
| | Outer-Ring Side | % | 100 | 118 |

From the results shown in Table 1 through Table 6, when comparing the outer ring flange bearing with the inner ring flange bearing, both of which have a same bearing dimension, with the maximum rolling element load and maximum contact surface pressure of the inner ring flange bearing being 100 percent, it was confirmed that the outer ring flange bearings within the specifications set by the present invention are capable of holding both of the maximum rolling element load and the maximum contact surface pressure within 10 percent increase over their counterpart inner ring flange bearings, while in the outer ring flange bearings which are out of the specifications set by the present invention, at least one of the maximum rolling element load or the maximum contact surface pressure increased at a rate greater than 10 percent over their counterpart inner ring flange bearings.

DESCRIPTION OF EMBODIMENTS

Hereinafter, embodiments of the present invention will be described with reference to the attached drawings.

A tapered roller bearing 11 according to the present invention has a steep contact angle α of 40° through 50°, and a gentle roller angle not greater than 3.5°. The tapered roller bearing 11 according to an embodiment as shown in FIG. 3 through FIG. 33 has a contact angle α of 45°, and a roller angle of 3.5°.

Figure 1:
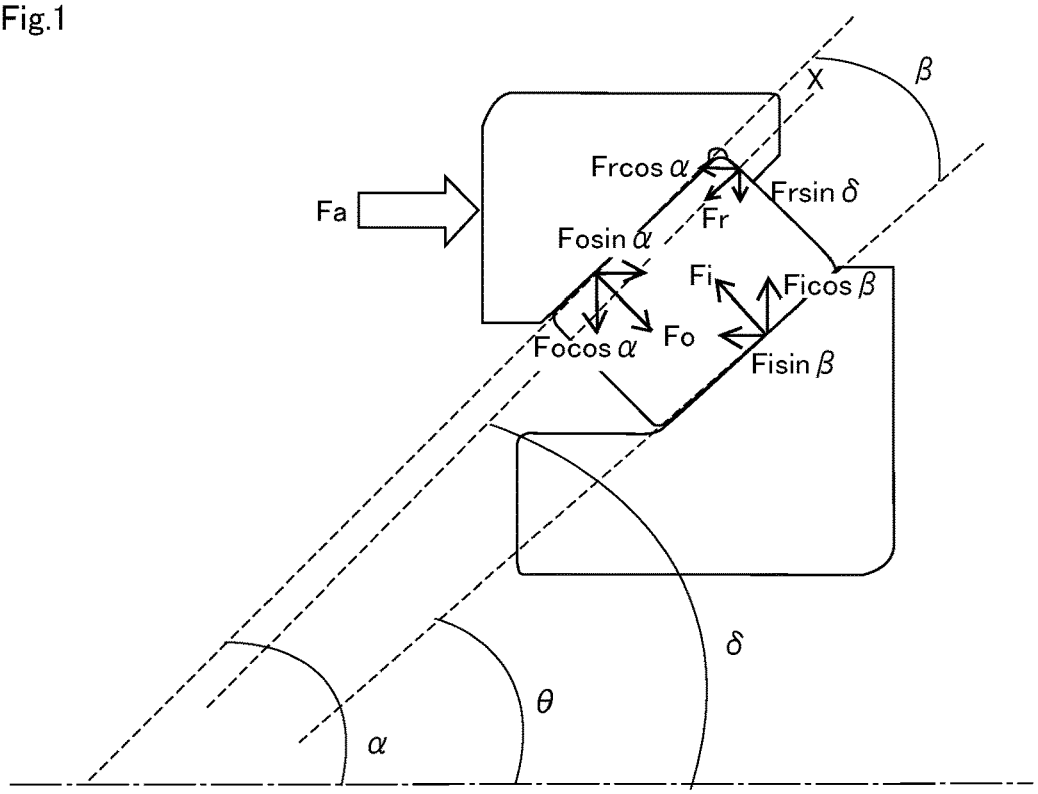
FIG. 1 is an explanatory drawing which schematically shows component forces of an outer ring side rolling element load, an inner ring side rolling element load, and a flange-side rolling element load when a pure axial load is applied to a tapered roller bearing in which a flange portion is formed at a large-diameter end of an outer ring track surface of an outer ring.
Figure 2:
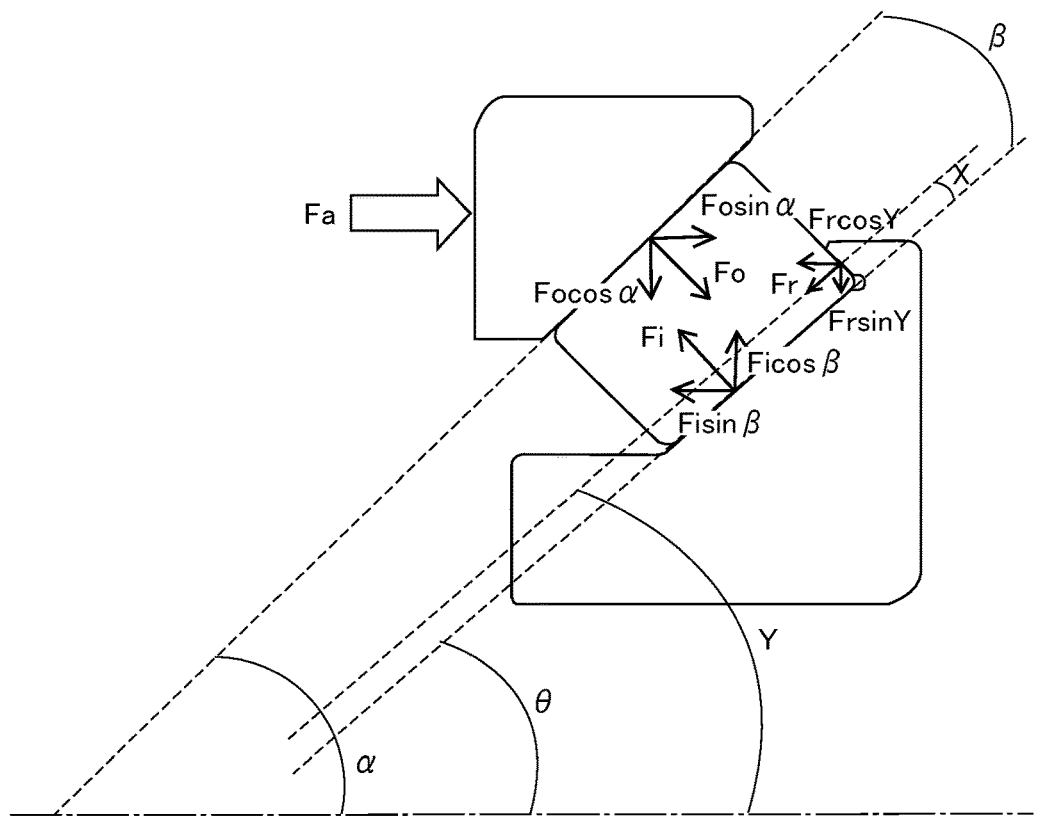
FIG. 2 is an explanatory drawing which schematically shows component forces of an outer ring side rolling element load, an inner ring side rolling element load, and a flange side rolling element load when a pure axial load is applied to a tapered roller bearing in which a flange portion is formed at a large-diameter end of an inner ring track surface of an inner ring.
Figure 3:
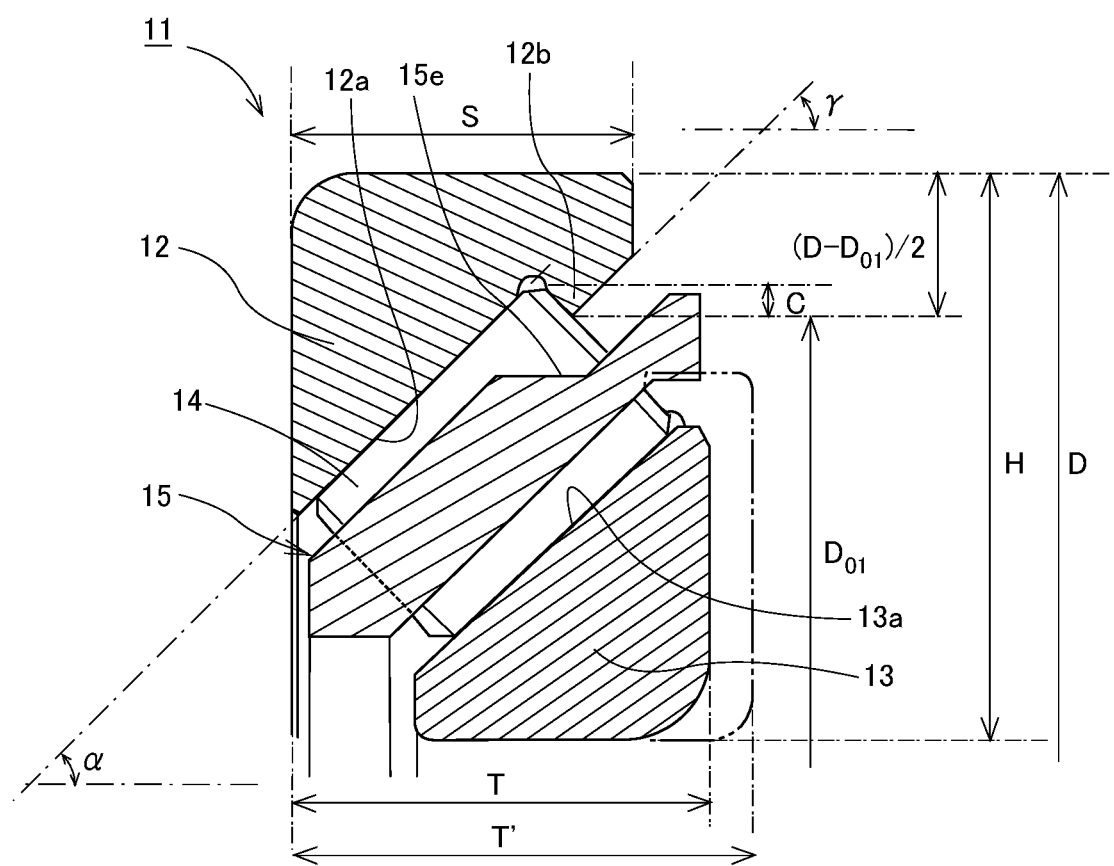
FIG. 3 is an enlarged partial sectional view of a tapered roller bearing according to an embodiment of the present invention, taken by cutting along a pillar portion of a retainer.

As shown in FIG. 3, the tapered roller bearing 11 according to the embodiment of the present invention includes: an outer ring 12 having an outer ring track surface 12a on its inner circumferential surface; an inner ring 13 having an inner ring track surface 13a on its outer circumferential surface; a plurality of tapered rollers 14 rotatably disposed between the outer ring track surface 12a and the inner ring surface 13a; and a retainer 15 having a plurality of pockets for retaining the plurality of tapered rollers 14 at a predetermined interval.

The tapered roller bearing 11 according to the present invention is intended for high moment stiffness with a steep contact angle α of 40 through 50°. The tapered roller bearing 11 according to the embodiment in FIG. 3 has a contact angle α of 45°.

In the tapered roller bearing 11 according to the embodiment of the present invention, the outer ring track surface 12a of the outer ring 12 has a small-diameter end and a large-diameter end, the inner ring track surface 13a of the inner ring 13 has a small-diameter end and a large-diameter end, and, of these four ends, a flange portion 12b that radially inwardly protrudes is formed only at the large-diameter end of the outer ring track surface 12a of the outer ring 12.

The small-diameter end of the inner ring 13 does not have a small flange, and the rollers have an increased length as much as the length of eliminated small flange, for increased load capacity. At the same time, the flange portion 12b that radially inwardly protrudes is formed only at the large-diameter end of the outer ring track surface 12a of the outer ring 12. The large-diameter end of the inner ring track surface 13a of the inner ring 13 does not have a flange portion.

The tapered roller bearing 11 with the steep contact angle of 40 through 50° has a large space in its axial direction between the large-diameter end of the outer ring track surface 12a of the outer ring 12 and the large-diameter-side end surface of the inner ring 13. In the present invention, the flange portion 12b that radially inwardly protrudes is formed by using the space.

By forming the flange portion 12b that radially inwardly protrudes only at the large-diameter end of the outer ring track surface 12a of the outer ring 12 and by eliminating the flange portion at the large-diameter end of the inner ring track surface 13a of the inner ring 13, it becomes possible to compactify its axial dimension.

Namely, as indicated in alternate long and two short dashes lines in FIG. 3, when the flange portion 12b is formed at the large-diameter end of the inner ring track surface 13a of the inner ring 13, the axial width will be T'. By eliminating the flange portion at the large-diameter end of the inner ring track surface 13a of the inner ring 13, it becomes possible to decrease the axial width of the inner ring 13. When the flange portion 12b that radially inwardly protrudes is formed at the large-diameter end of the outer ring track surface 12a of the outer ring 12, the axial width will be T. Therefore, it is possible to compactify the axial width by T'-T.

Figure 36:
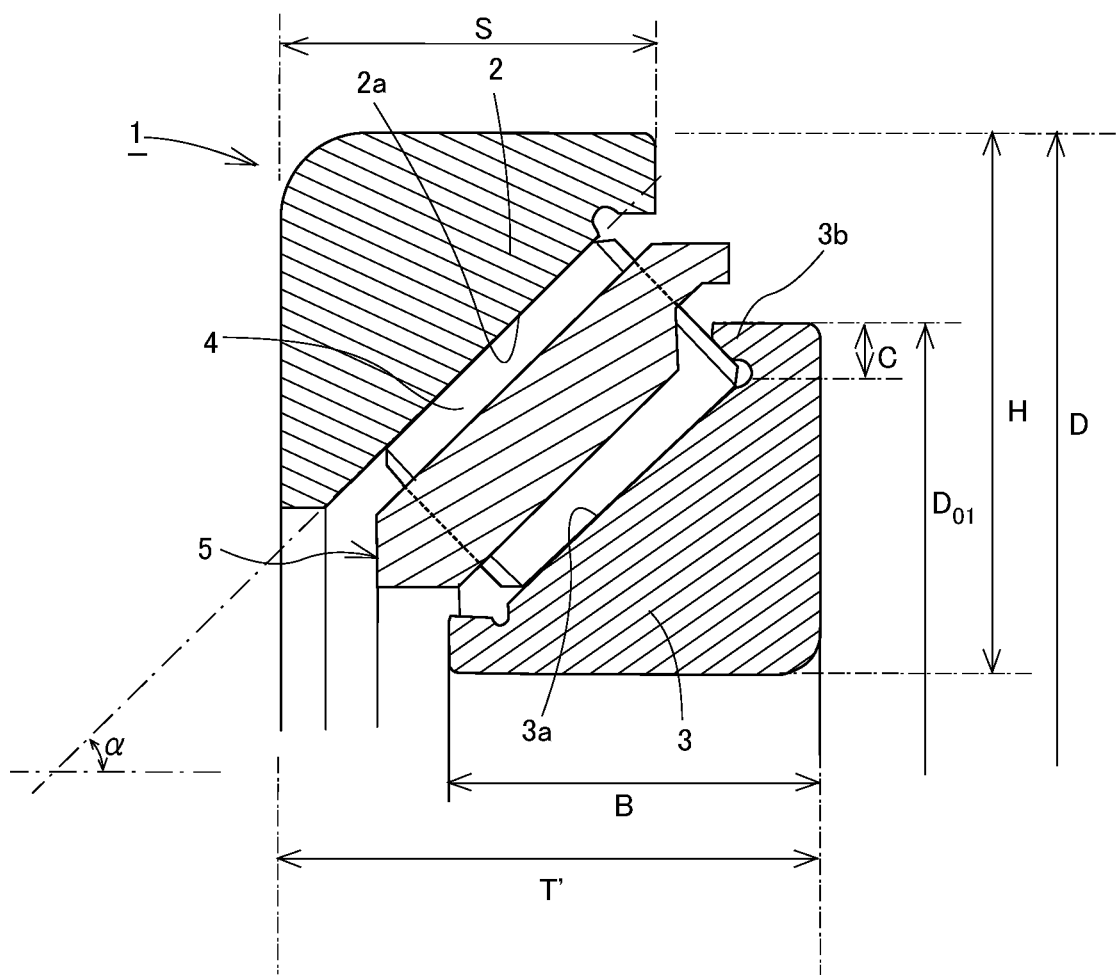
FIG. 36 is an enlarged sectional view of a conventional tapered roller bearing, taken by cutting along a pillar portion of a retainer.

By forming the flange portion 12b that radially inwardly protrudes at the large-diameter end of the outer ring track surface 12a of the outer ring 12 as disclosed in the present invention, it becomes possible to increase stiffness of the flange portion compared with a conventional tapered roller bearing 1 as shown in FIG. 36 which has a flange portion formed at the large-diameter end of the inner ring track surface 13a of the inner ring 13.

Figure 5:
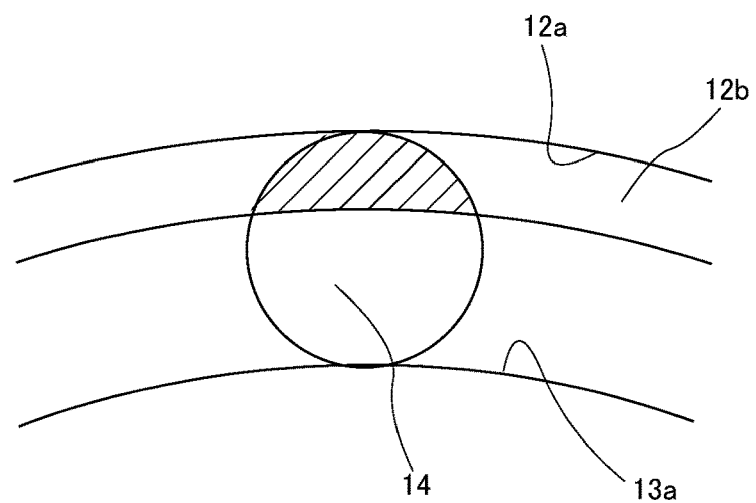
FIG. 5 is a simplified schematic illustration which conceptually shows a contact area between a large flange portion at an outer ring side of the tapered roller bearing in FIG. 3 and a tapered roller.
Figure 38:
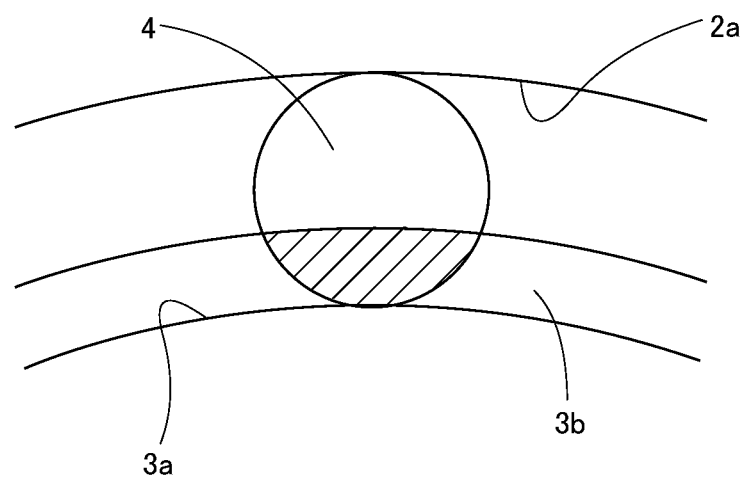
FIG. 38 is a simplified schematic illustration which conceptually shows a contact area between a large flange portion at an inner ring side of the tapered roller bearing in FIG. 36 and a tapered roller.

Namely, when comparing a case where the flange portion 12b that radially inwardly protrudes is formed at the large-diameter end of the outer ring track surface 12a of the outer ring 12 as shown in FIG. 3 with a case where a flange portion 3b is formed at the large-diameter end of the inner ring track surface 3a of the inner ring 3 as shown in FIG. 36, it is confirmed that even if the height of the flange portion C (a radial distance from an intersection between the track surface and the flange surface to an apex of the flange portion) is the same, a contact area between the roller end surface and the outer ring flange surface as shown in FIG. 5 is greater, by approximately 7 percent, than a contact area between the roller end surface and the inner ring flange surface of the conventional arrangement as shown in FIG. 38. This means that induced thrust force generated in the roller is received by the greater area when the outer ring has a flange, which decreases stress at the place of contact, leading to decreased contact strain between the roller end surface and the flange surface.

Figure 4:
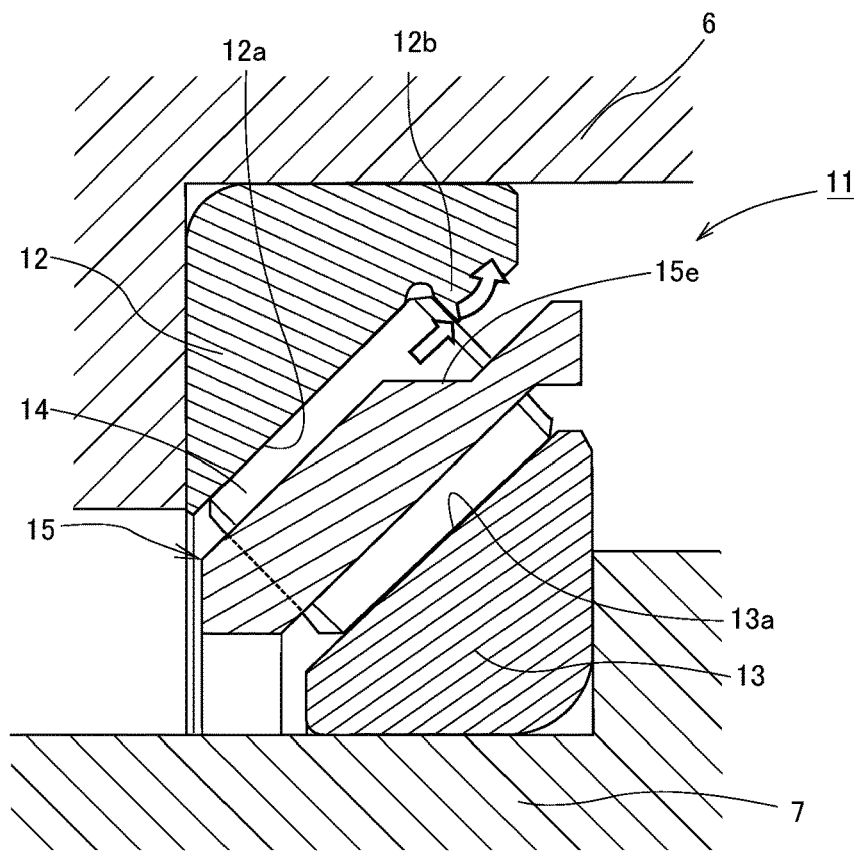
FIG. 4 is an enlarged partial sectional view showing a state in which the tapered roller bearing in FIG. 3 is assembled to a housing.
Figure 37:
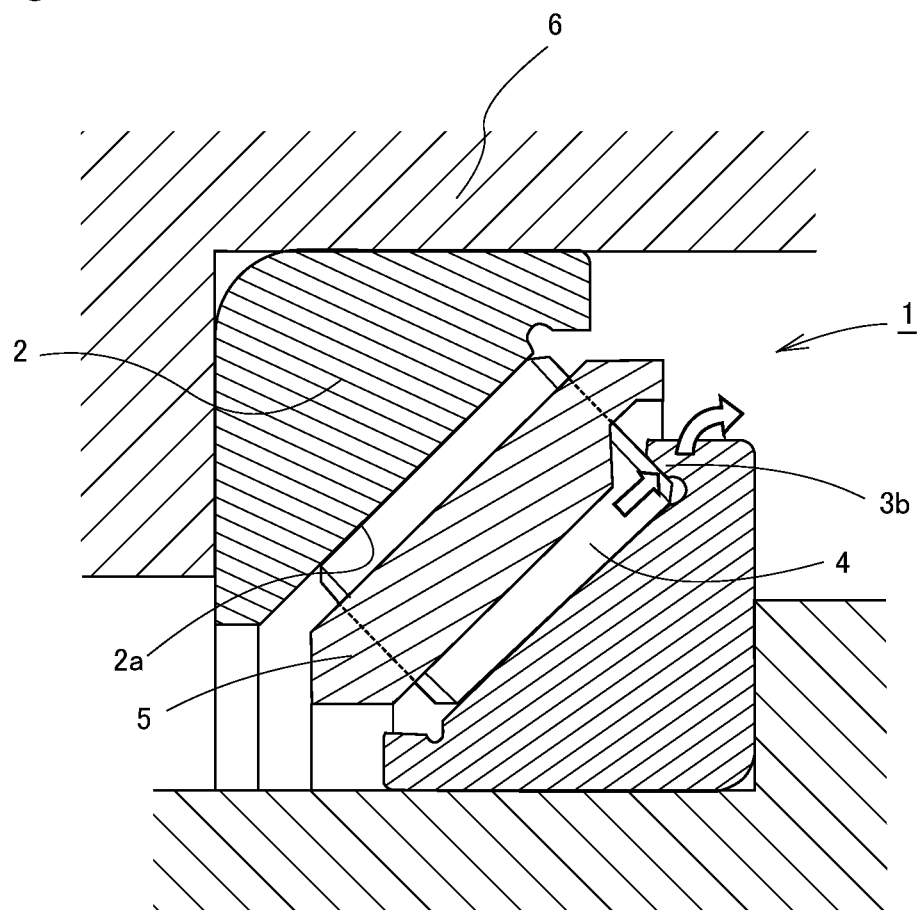
FIG. 37 is an enlarged partial sectional view showing a state in which the tapered roller bearing in FIG. 36 is assembled to a housing.

Also, in the conventional arrangement as shown in FIG. 36, where the flange portion 3b is formed at the large-diameter end of the inner ring 3, the induced thrust force generated in a tapered roller 4 is received by the flange portion 3b as indicated by white arrows in FIG. 37, and this poses a potential problem that a bending stress acting on the flange portion 3b may cause the flange portion 3b to distort. On the contrary, according to the present invention as shown in FIG. 4, where the flange portion 12b is formed at the large-diameter end of the outer ring 12, it is possible, as indicated by white arrows, to receive the induced thrust force generated in a tapered roller 14, i.e., the bending stress acting on the flange portion 12b of the outer ring 12, with the housing 6, and this increases stiffness of the flange portion 12b. Note that in the conventional arrangement as shown in FIG. 36, a reference sign 2 represents an outer ring, a sign 2a represents an outer ring track surface, and a sign 5 represents a retainer.

In the present invention, the retainer 15 may be made of a resin.

Figure 6:
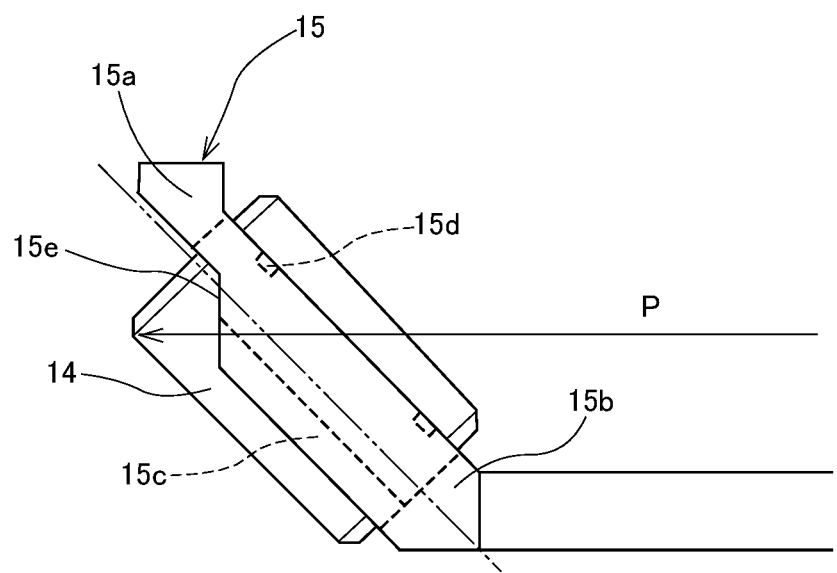
FIG. 6 is an enlarged view showing a state in which a tapered roller is pressed to contact with a roller guide surface of a retainer of the embodiment in FIG. 3.
Figure 7:
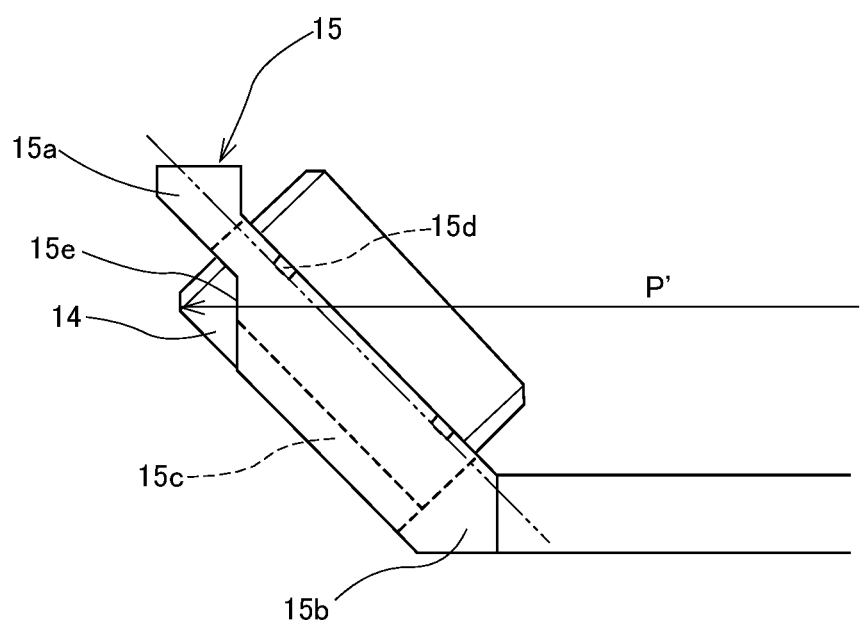
FIG. 7 is an enlarged view showing a state in which a tapered roller is pressed to contact with a tab of the retainer of the embodiment in FIG. 3.

As shown in FIG. 6 and FIG. 7, the retainer 15 has a large-diameter ring portion 15a on its large-diameter side; a small-diameter ring portion 15b on its small-diameter side; roller guide surfaces 15c on its outer diameter portion for guiding the tapered rollers 14; and tabs 15d on its inner diameter surface for retaining the tapered rollers 14. However, the position of the roller guide surfaces 15c for guiding the tapered rollers 14 and the tabs 15d for retaining the tapered rollers 14 may be reversed. Also, the retainer 15 is provided with, on an outer circumferential surface of the large-diameter ring portion 15a, a cutout 15e to avoid interference with the flange portion 12b of the outer ring 12.

Figure 8A:
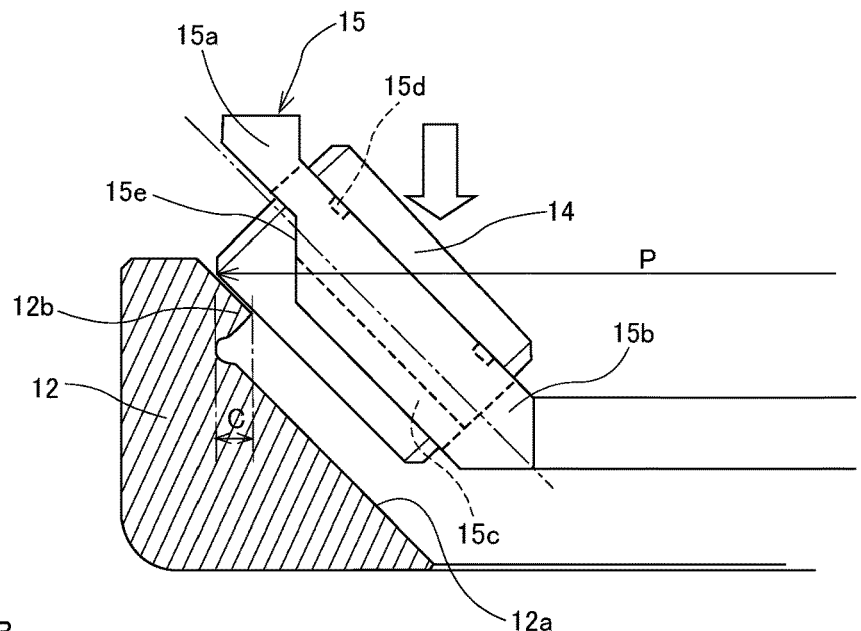
FIG. 8A is an enlarged partial sectional view showing a step for insertion of a roller-retainer assay into an outer ring.
Figure 8B:
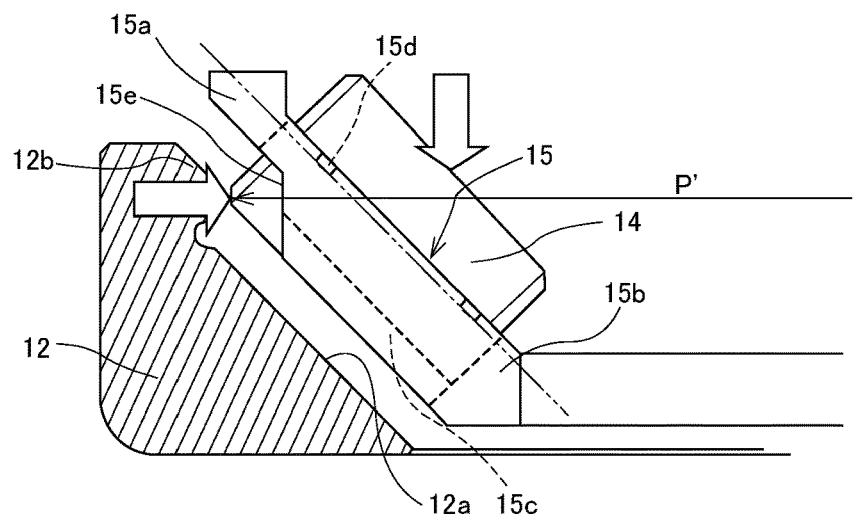
FIG. 8B is an enlarged partial sectional view showing a step for insertion of the roller-retainer assay into the outer ring.
Figure 8C:
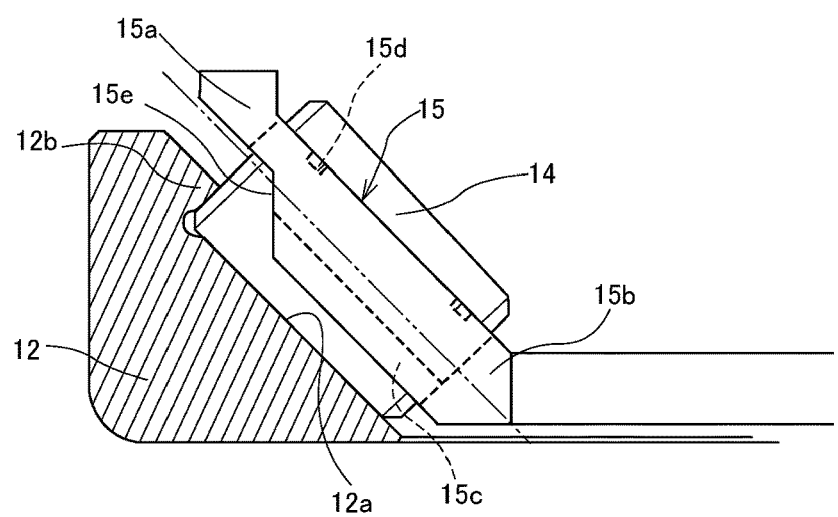
FIG. 8C is an enlarged partial sectional view showing a step for insertion of the roller-retainer assay into the outer ring.
Figure 9:
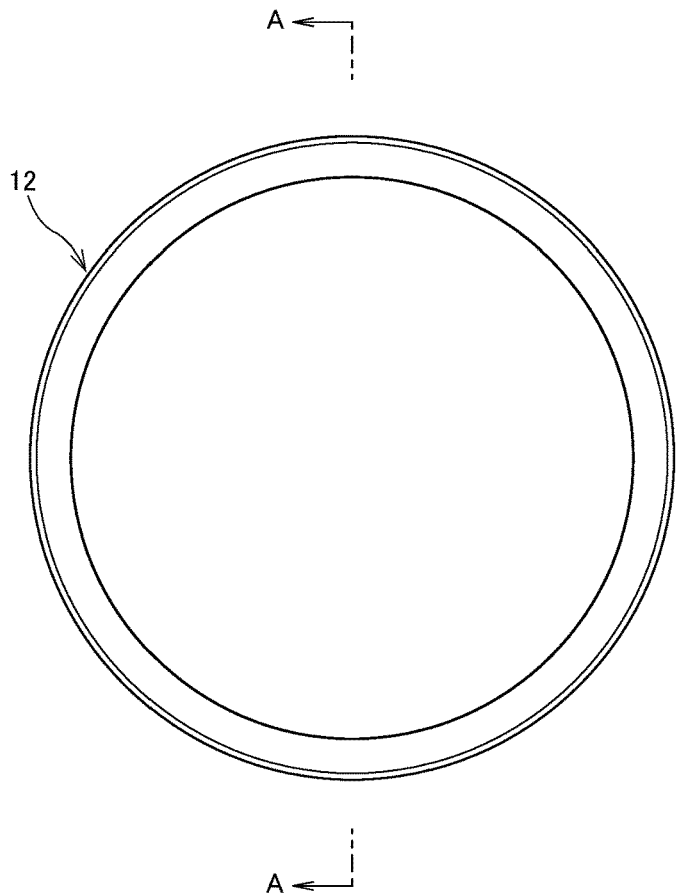
FIG. 9 is a front view of the outer ring in the embodiment in FIG. 3.
Figure 10:
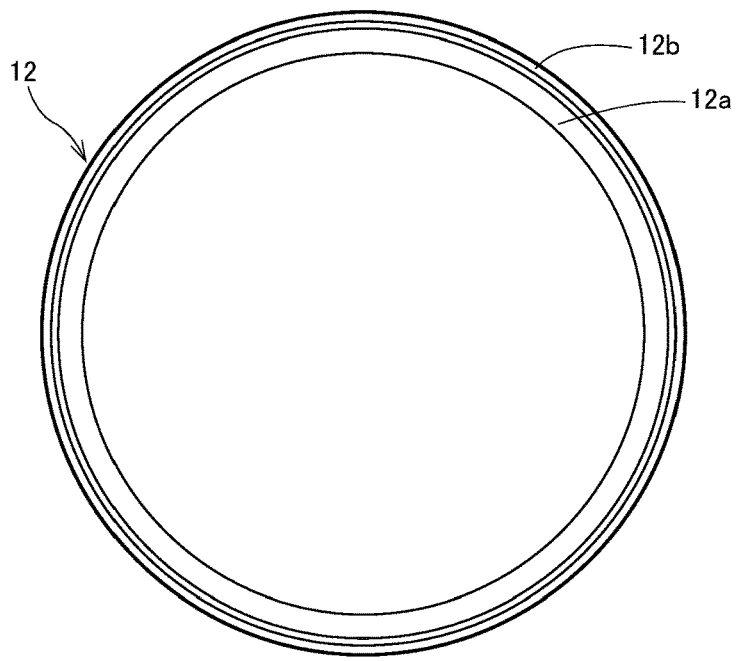
FIG. 10 is a rear view of the outer ring in the embodiment in FIG. 3.
Figure 11:
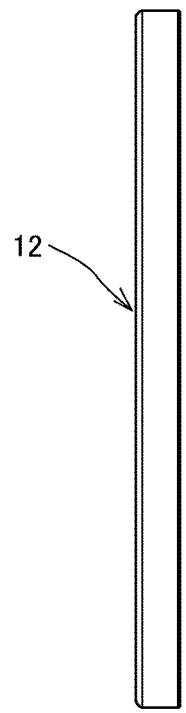
FIG. 11 is a left side view of the outer ring in the embodiment in FIG. 3.
Figure 12:
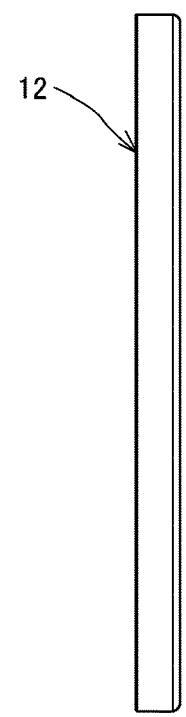
FIG. 12 is a right side view of the outer ring in the embodiment in FIG. 3.
Figure 13:
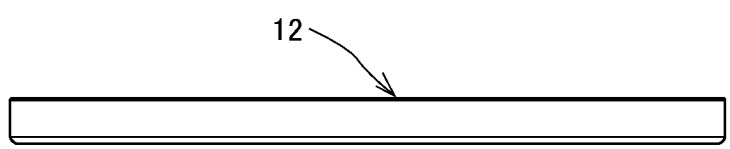
FIG. 13 is a plan view of the outer ring in the embodiment in FIG. 3.
Figure 14:
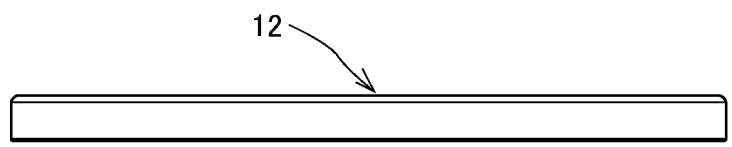
FIG. 14 is a bottom view of the outer ring in the embodiment in FIG. 3.
Figure 15:
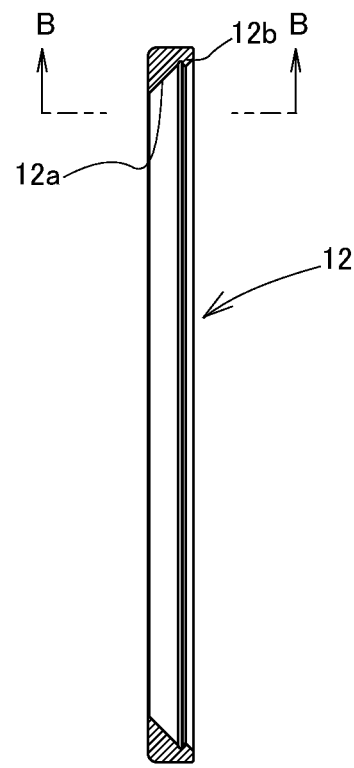
FIG. 15 is a sectional view taken in a line A-A in FIG. 9.
Figure 16:
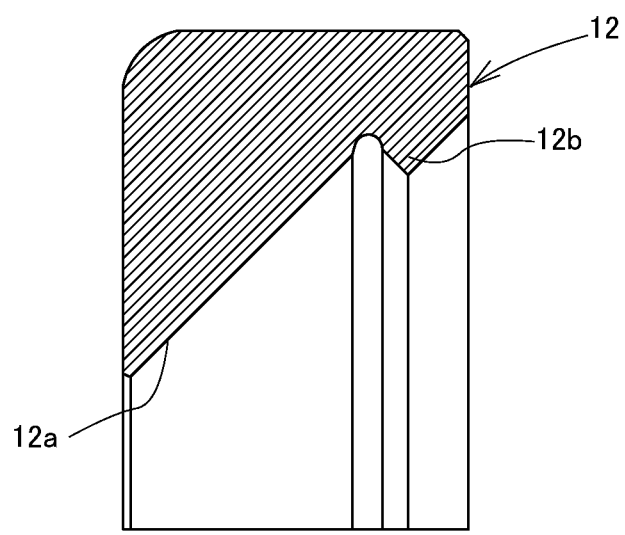
FIG. 16 is an enlarged sectional view taken in a line B-B in FIG. 15.
Figure 17:
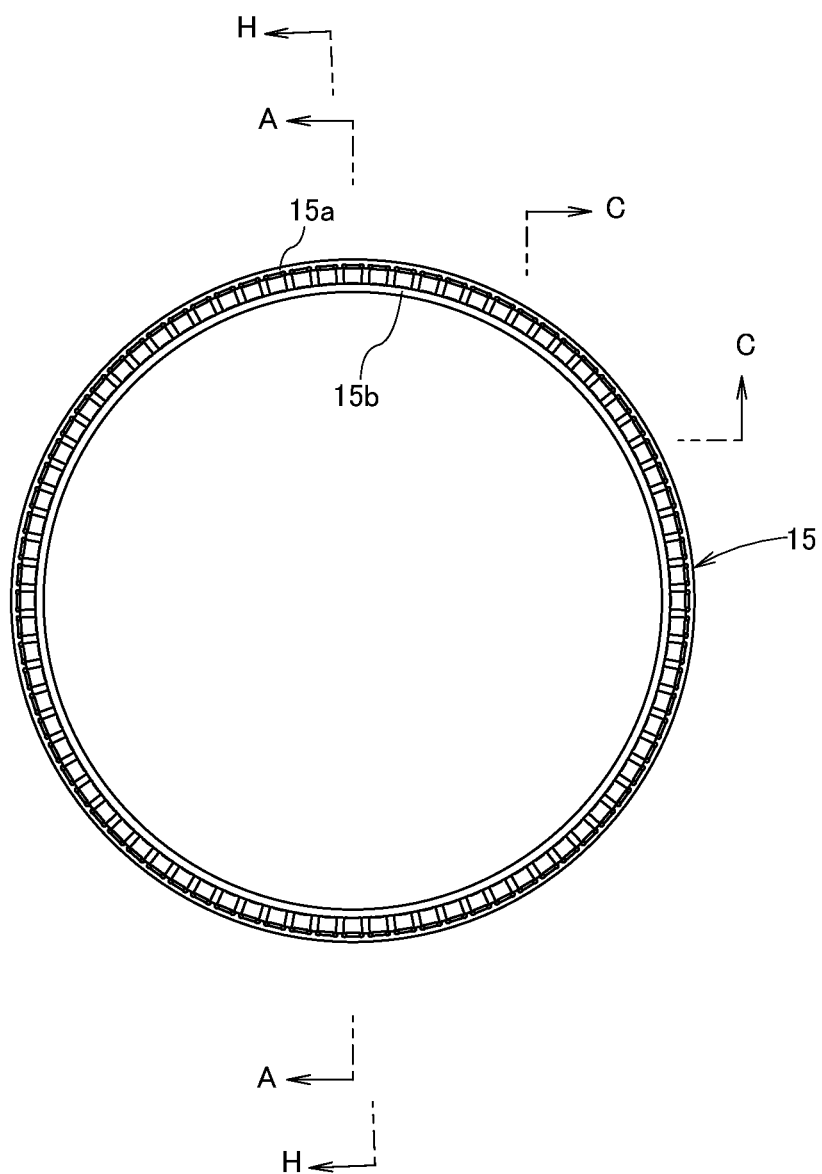
FIG. 17 is a front view of a retainer in the embodiment in FIG. 3.
Figure 18:
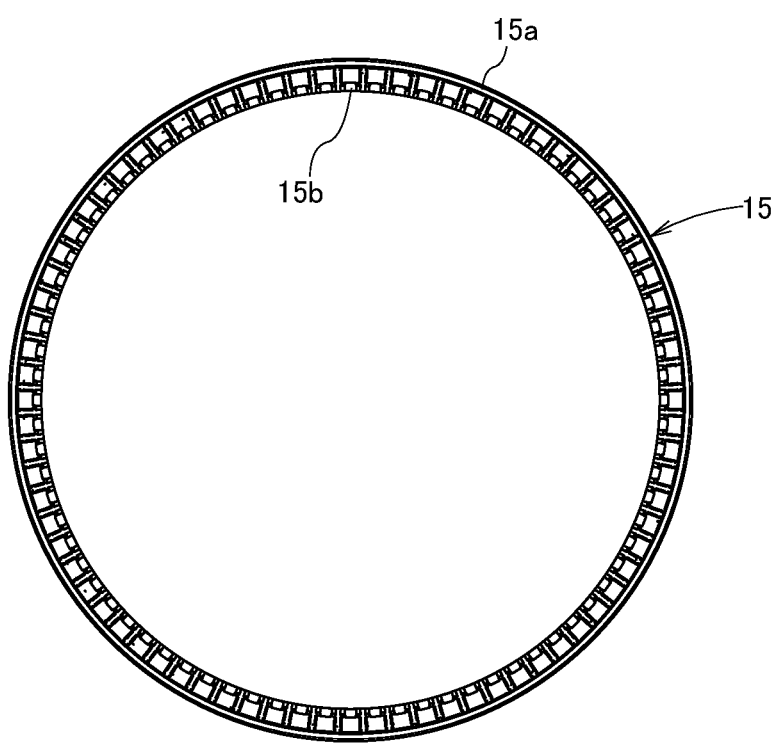
FIG. 18 is a rear view of the retainer in the embodiment in FIG. 3.
Figure 19:
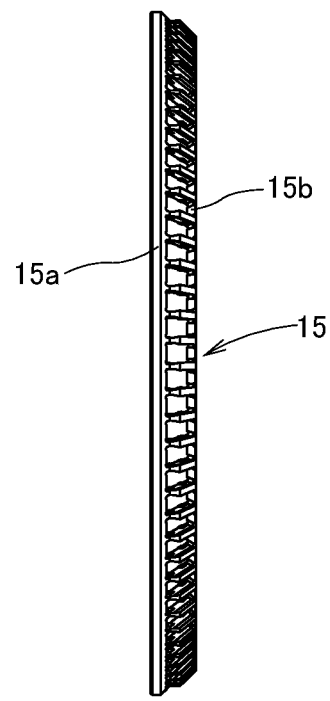
FIG. 19 is a left side view of the retainer in the embodiment in FIG. 3.
Figure 20:
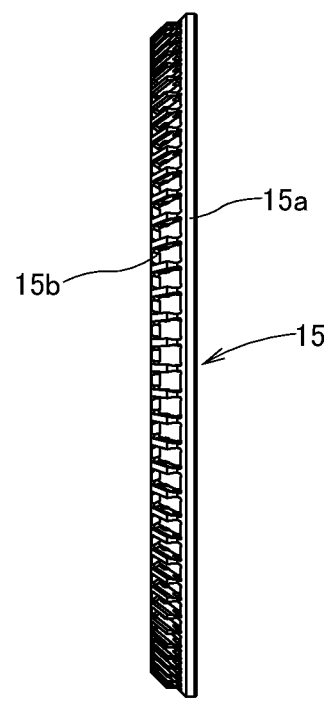
FIG. 20 is a right side view of the retainer in the embodiment in FIG. 3.
Figure 21:
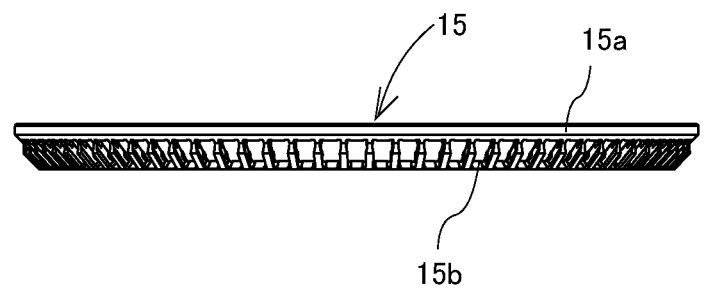
FIG. 21 is a plan view of the retainer in the embodiment in FIG. 3.
Figure 22:
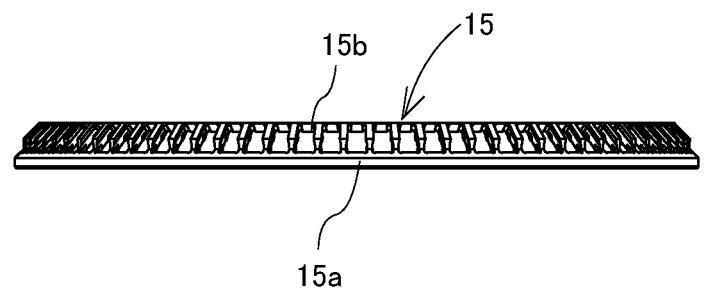
FIG. 22 is a bottom view of the retainer in the embodiment in FIG. 3.
Figure 23:
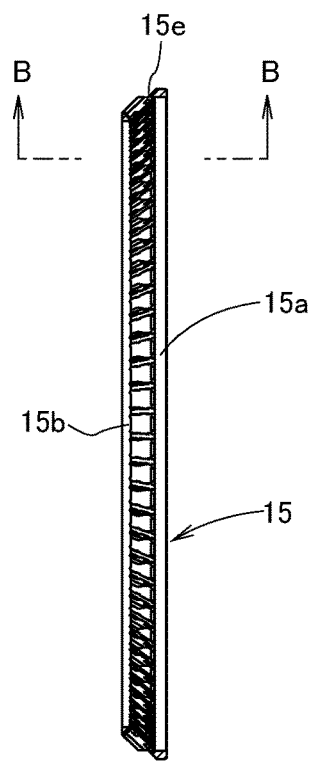
FIG. 23 is a sectional view taken in a line A-A in FIG. 17.
Figure 24:
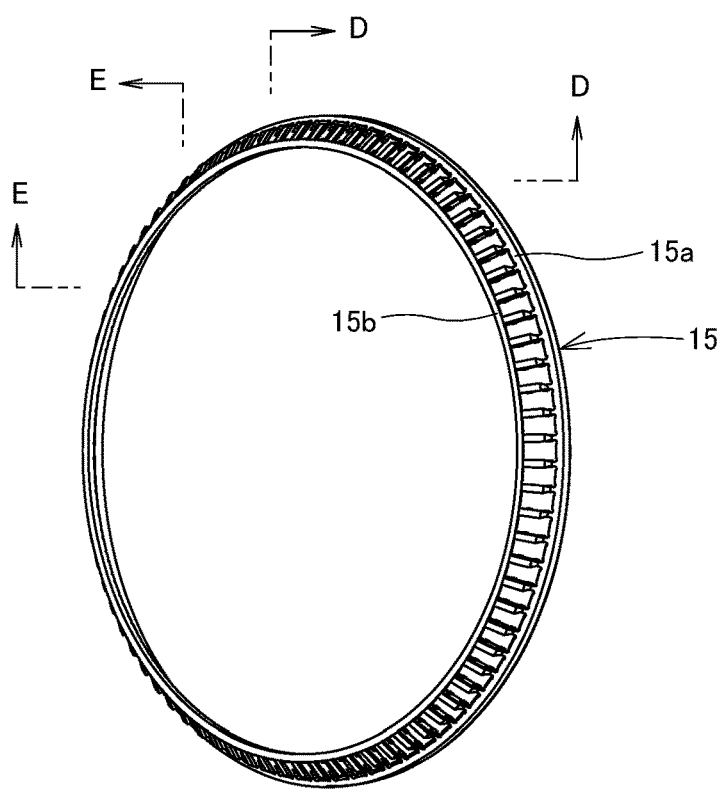
FIG. 24 is a perspective view of the retainer of the embodiment in FIG. 3 viewed from a small-diameter side.
Figure 25:
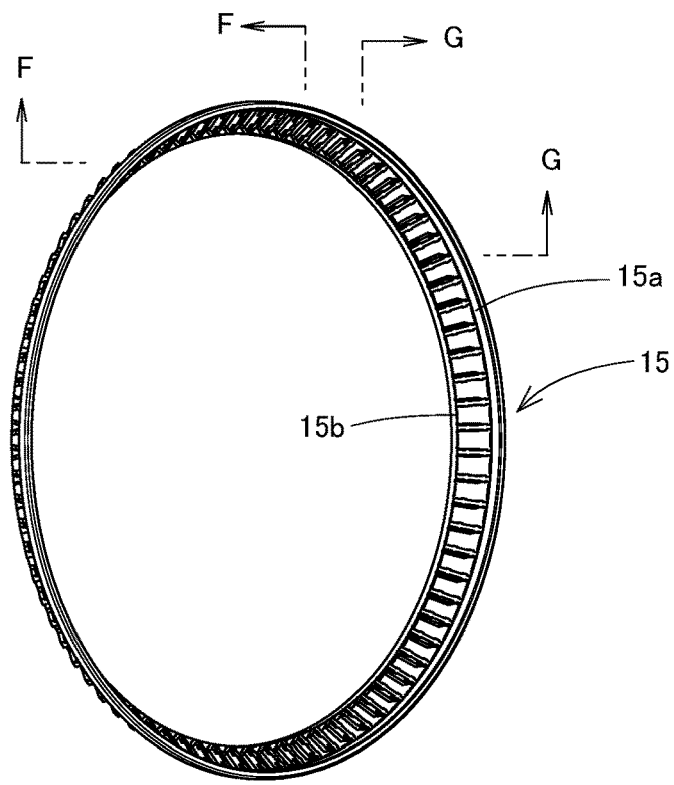
FIG. 25 is a perspective view of the retainer of the embodiment in FIG. 3 viewed from a large-diameter side.
Figure 26:
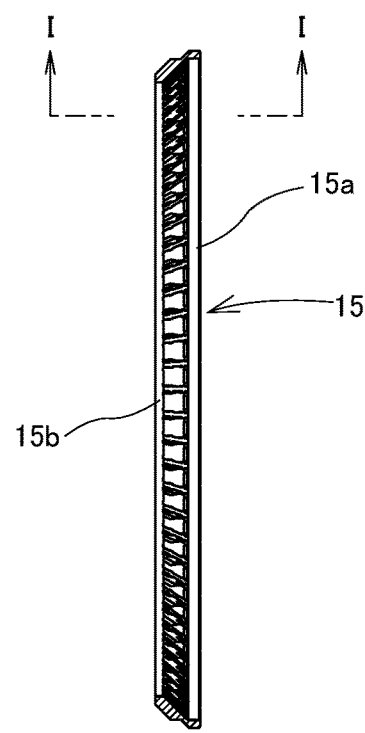
FIG. 26 is a sectional view taken in a line H-H in FIG. 17.
Figure 27:
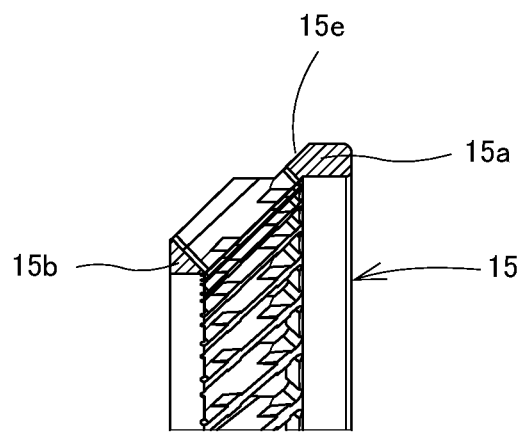
FIG. 27 is an enlarged sectional view taken in a line B-B in FIG. 23.
Figure 28:
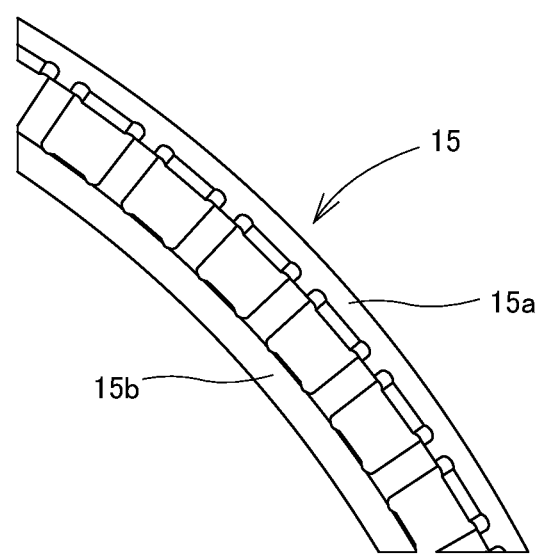
FIG. 28 is an enlarged sectional view taken in a line C-C in FIG. 17.
Figure 29:
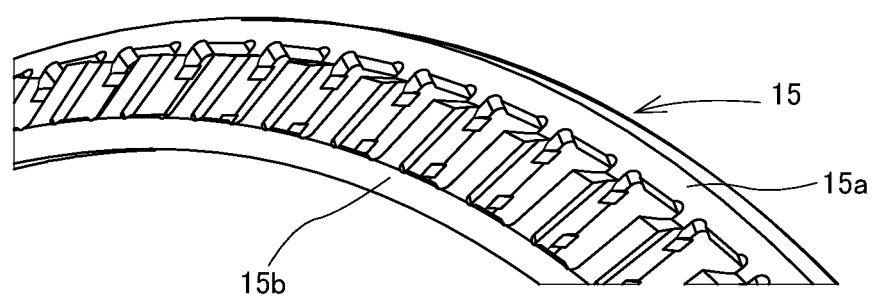
FIG. 29 is an enlarged sectional view taken in a line D-D in FIG. 24.
Figure 30:
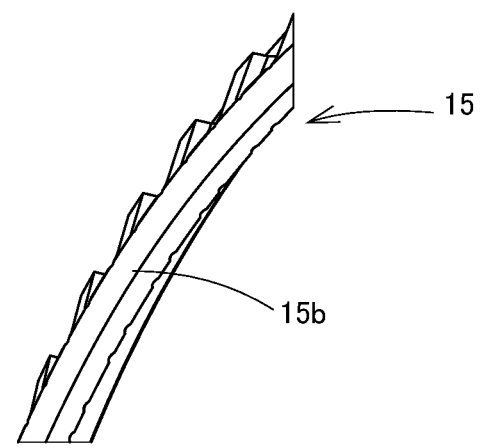
FIG. 30 is an enlarged sectional view taken in a line E-E in FIG. 24.
Figure 31:
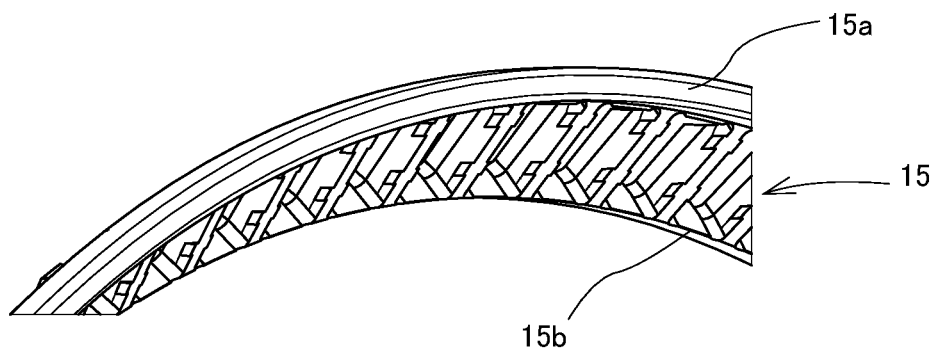
FIG. 31 is an enlarged sectional view taken in a line F-F in FIG. 25.
Figure 32:
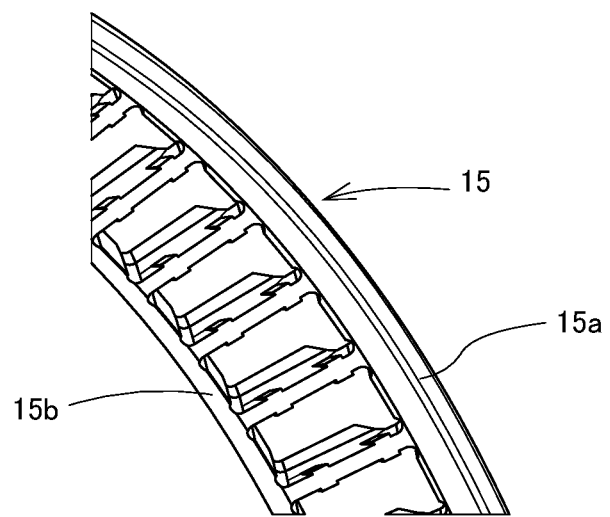
FIG. 32 is an enlarged sectional view taken in a line G-G in FIG. 25.
Figure 33:
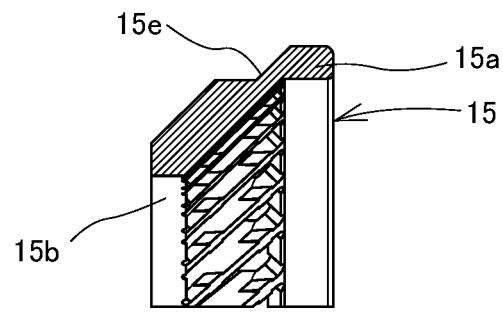
FIG. 33 is an enlarged sectional view taken in a line I-I in FIG. 26.

As shown in FIG. 6, a circumradius of the roller is represented with P when the tapered roller 14 is pressed to contact with the roller guide surface 15c which is at the outer diameter side of the retainer 15; as shown in FIG. 7, a circumradius of the roller is represented with P' when the tapered roller 14 is pressed to contact with the tabs 15d which are at the inner diameter side of the retainer 15. With these circumradii defined as the above, evaluation was made by inserting a roller-retainer assay into the outer ring 12 following steps as shown in FIGS. 8A, 8B and 8C, to see easiness of insertion by not varying the flange height C of the flange portion 12b but varying the contact angle α, flange outer diameter angle γ, and |P−P'|. Results are shown in Tables 7 through 11.

From the results in Table 7 through Table 11, it was confirmed that those bearings which have their contact angles set to 40 through 50° exhibit better insertability of the roller-retainer assay when |P−P'|≥C and the flange's large-diameter-side angle γ is 35° through 50°.

TABLE 7

| Contact Angle α° | Flange Outer Diameter Angle γ° | C | \|P − P'\| | Easiness of Insertion |
|---|---|---|---|---|
| 35 | 30 | 1 | 0.8 | x |
| 35 | 30 | 1 | 1 | x |
| 35 | 35 | 1 | 0.8 | x |
| 35 | 35 | 1 | 1 | x |
| 35 | 45 | 1 | 0.8 | x |
| 35 | 45 | 1 | 1 | x |
| 35 | 45 | 1 | 2 | x |
| 35 | 50 | 1 | 0.8 | x |
| 35 | 50 | 1 | 1 | x |
| 35 | 50 | 1 | 2 | x |
| 35 | 55 | 1 | 1 | x |
| 35 | 55 | 1 | 2 | x |

TABLE 8

| Contact Angle α° | Flange Outer Diameter Angle γ° | C | \|P − P'\| | Easiness of Insertion |
|---|---|---|---|---|
| 40 | 30 | 1 | 0.8 | x |
| 40 | 30 | 1 | 1 | x |
| 40 | 35 | 1 | 0.8 | x |
| 40 | 35 | 1 | 1 | o |
| 40 | 45 | 1 | 0.8 | x |
| 40 | 45 | 1 | 1 | o |
| 40 | 45 | 1 | 2 | o |
| 40 | 50 | 1 | 0.8 | x |
| 40 | 50 | 1 | 1 | o |
| 40 | 55 | 1 | 2 | o |
| 40 | 55 | 1 | 1 | x |
| 40 | 55 | 1 | 2 | x |

TABLE 9

| Contact Angle α° | Flange Outer Diameter Angle γ° | C | \|P − P'\| | Easiness of Insertion |
|---|---|---|---|---|
| 45 | 30 | 1 | 0.8 | x |
| 45 | 30 | 1 | 1 | x |
| 45 | 35 | 1 | 0.8 | x |
| 45 | 35 | 1 | 1 | o |
| 45 | 45 | 1 | 0.8 | x |
| 45 | 45 | 1 | 1 | o |
| 45 | 45 | 1 | 2 | o |
| 45 | 50 | 1 | 0.8 | x |
| 45 | 50 | 1 | 1 | o |
| 45 | 50 | 1 | 2 | o |
| 45 | 55 | 1 | 1 | x |
| 45 | 55 | 1 | 2 | x |

TABLE 10

| Contact Angle α° | Flange Outer Diameter Angle γ° | C | \|P − P'\| | Easiness of Insertion |
|---|---|---|---|---|
| 50 | 30 | 1 | 0.8 | x |
| 50 | 30 | 1 | 1 | x |
| 50 | 35 | 1 | 0.8 | x |
| 50 | 35 | 1 | 1 | o |
| 50 | 45 | 1 | 0.8 | x |

TABLE 10-continued

| Contact Angle α° | Flange Outer Diameter Angle γ° | C | \|P − P'\| | Easiness of Insertion |
|---|---|---|---|---|
| 50 | 45 | 1 | 1 | ○ |
| 50 | 45 | 1 | 2 | ○ |
| 50 | 50 | 1 | 0.8 | x |
| 50 | 50 | 1 | 1 | ○ |
| 50 | 50 | 1 | 0 | ○ |
| 50 | 55 | 1 | 1 | x |
| 50 | 55 | 1 | 2 | x |

TABLE 11

| Contact Angle α° | Flange Outer Diameter Angle γ° | C | \|P − P'\| | Easiness of Insertion |
|---|---|---|---|---|
| 55 | 30 | 1 | 0.8 | x |
| 55 | 30 | 1 | 1 | x |
| 55 | 35 | 1 | 0.8 | x |
| 55 | 35 | 1 | 1 | x |
| 55 | 45 | 1 | 0.8 | x |
| 55 | 45 | 1 | 1 | x |
| 55 | 45 | 1 | 2 | x |
| 55 | 50 | 1 | 0.8 | x |
| 55 | 50 | 1 | 1 | x |
| 55 | 50 | 1 | 2 | x |
| 55 | 55 | 1 | 1 | x |
| 55 | 55 | 1 | 2 | x |

Figure 34:
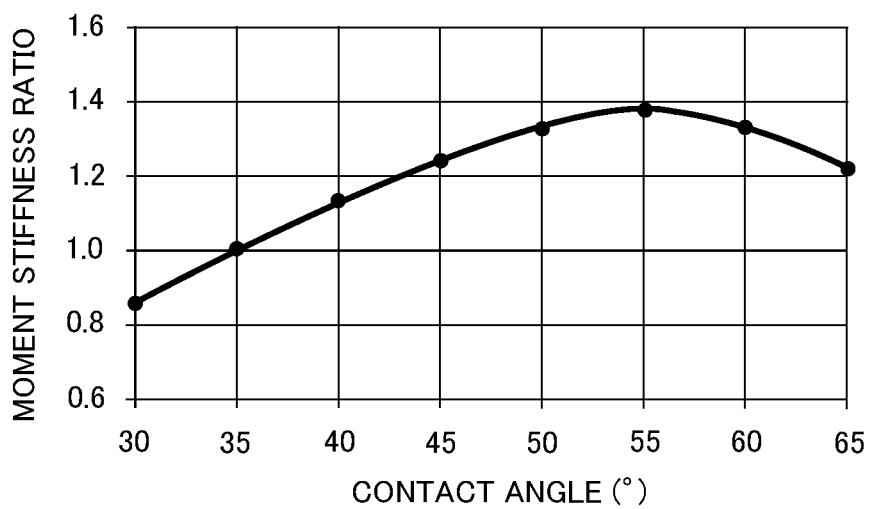
FIG. 34 is a graph which shows moment stiffness ratio in examples wherein each contact angle is varied.
Figure 35:
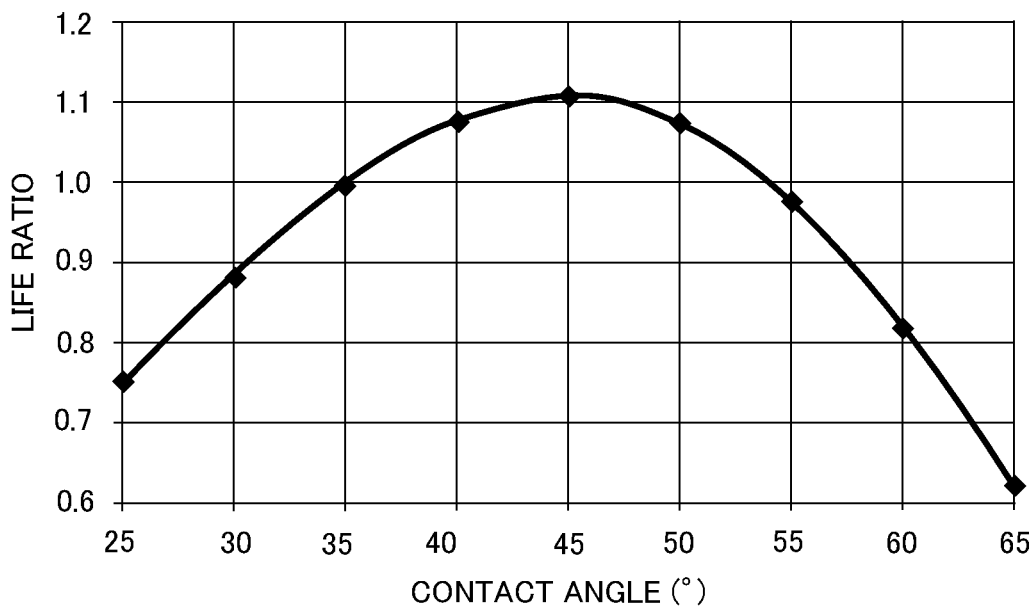
FIG. 35 is a graph which shows life ratio in examples wherein each contact angle is varied.

The tapered roller bearing 11 according to the present invention, having the contact angle of 40 through 50°, has moment stiffness expressed in a graph in FIG. 34 and life ratio expressed in a graph in FIG. 35 when only the contact angle is varied, with an external load, the bearing's PCD, and size and quantity of the rollers maintained constant. From the graphs given in FIG. 34 and FIG. 35, overall evaluation was made relative to each contact angle. Results are shown in Table 12, i.e., it was confirmed that by setting the contact angle in the range of 40 through 50°, it becomes possible to improve both the moment stiffness and the life of the bearing.

TABLE 12

| | Contact Angle | | | | | | | | |
|---|---|---|---|---|---|---|---|---|---|
| | 25 | 30 | 35 | 40 | 45 | 50 | 55 | 60 | 65 |
| Moment Stiffness | X | ○ | — | ○ | ○ | ○ | ⊚ | ○ | ○ |
| Life | X | X | — | ○ | ⊚ | ○ | X | X | X |
| Total Evaluation | X | X | — | ⊚ | ⊚ | ⊚ | X | X | X |

The present invention is not limited to any of the embodiments described thus far, and it is obvious that the invention may be modified in many other ways within the scope of the present invention. The scope of the present invention is defined by the CLAIMS and includes all equivalents thereto and any variations therein.

REFERENCE SIGNS LIST

11: Bearing
12: Outer ring
12a: Outer Ring Track Surface
12b: Flange portion
13: Inner ring
13a: Inner ring track surface
15: Retainer
15a: Large-Diameter Ring Portion
15b: Small-Diameter Ring Portion
15c: Guide Surface
15d: Claw
15e: Cutout

The invention claimed is:

1. A tapered roller bearing comprising: an outer ring having an outer ring track surface on an inner circumferential surface; an inner ring having an inner ring track surface on an outer circumferential surface; a plurality of tapered rollers rotatably disposed between the outer ring track surface and the inner ring track surface; and a retainer having a plurality of pockets for retaining the plurality of tapered rollers at a predetermined interval; the outer ring track surface of the outer ring having a small-diameter end and a large-diameter end, the inner ring track surface of the inner ring having a small-diameter end and a large-diameter end, and, of the small-diameter ends and the large-diameter ends, a flange portion that radially inwardly protrudes is formed at the large-diameter end of the outer ring track surface of the outer ring; wherein the tapered roller bearing has a contact angle of 40° to 50° and a roller angle not greater than 3.5°.

2. The tapered roller bearing according to claim 1, wherein the retainer has: a tapered roller guide surface on an outer diameter side or inner diameter side; one or more tabs for preventing dislocation of the tapered rollers to the side not having the guide surface of the retainer; and a cutout formed on an outer circumferential surface of a large-diameter ring portion of the retainer for making the ring portion thinner than a pillar portion having the guide surface of the retainer.

3. The tapered roller bearing according to claim 2, wherein a relationship expressed as $|P-P'| \geq C$ is satisfied, where P represents a circumradius of the roller when the roller is in contact with the guide surface of the retainer; P' represents a circumradius of the roller when the roller is in contact with the tab of the retainer; and C represents a height of the outer ring flange from the track surface; and the flange has an outer diameter angle γ of 35° to 50°.

* * * * *